INVENTOR.
ALVIN M. MARKS
BY Philip D. Amino
ATTORNEY

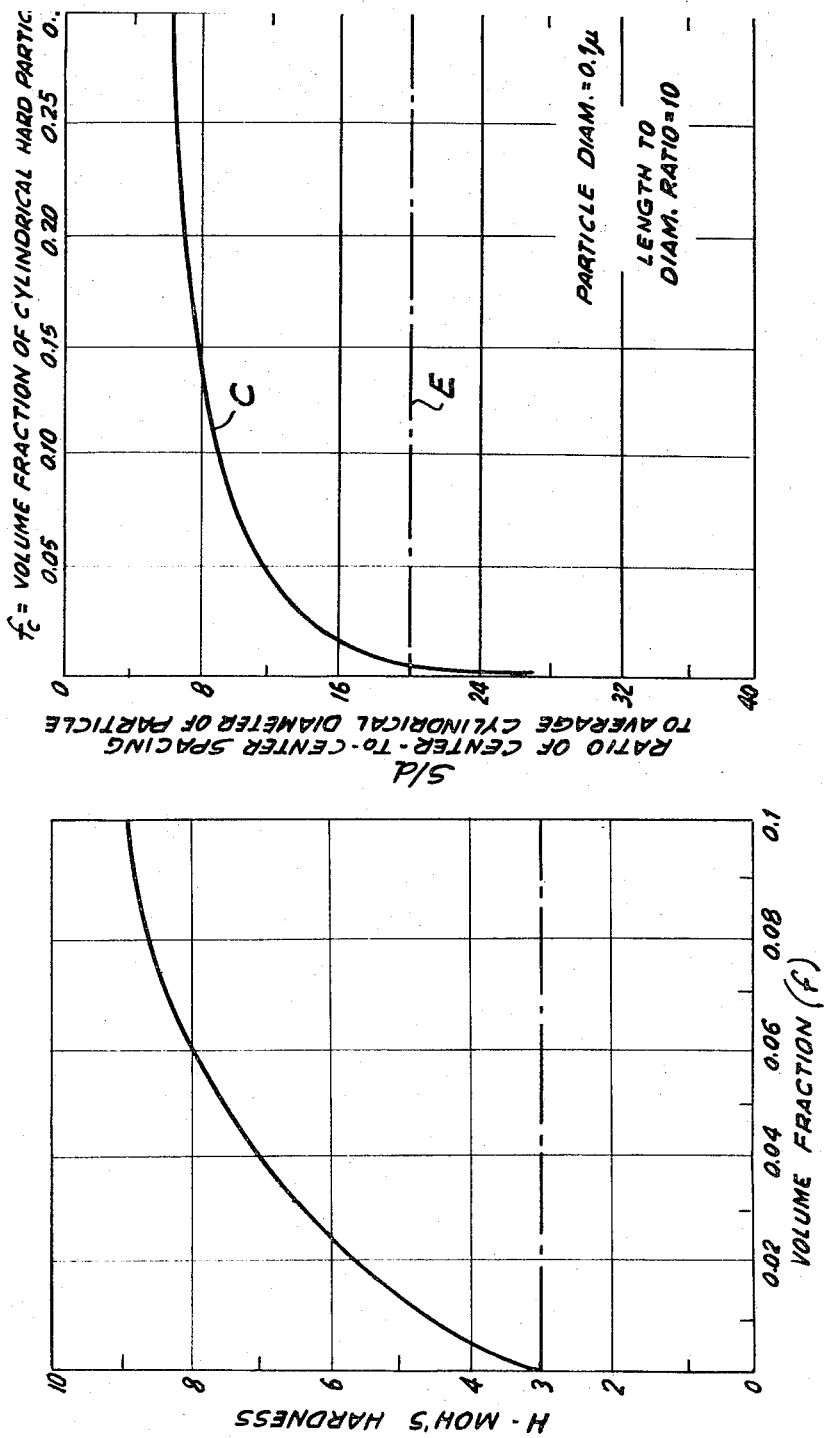
FIG.6
FIG.4
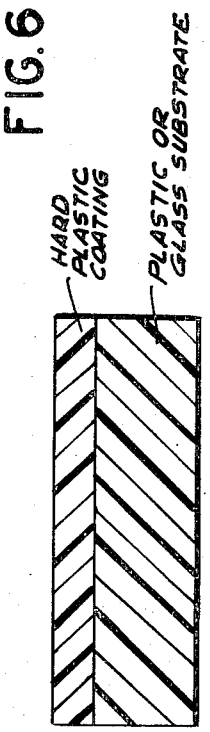
FIG.5

INVENTOR.
ALVIN M. MARKS 3,846,161
METHOD OF PRODUCING HARD TRANSPARENT
SHEET-LIKE MATERIAL OR COATING
Alvin M. Marks, 100 Blair Road E.,
Oyster Bay Cove, N.Y. 11771
Original application Oct. 4, 1967, Ser. No. 672,903, now
abandoned. Divided and this application July 14, 1971,
Ser. No. 162,382
Int. Cl. C08f 3/30, 3/64; B44d 5/00
U.S. Cl. 117—93          20 Claims

ABSTRACT OF THE DISCLOSURE

A method for producing a hard sheet or coating of composite material comprising a matrix of plastic material having dispersed therethrough finely divided hard particles having a hardness of at least 5, for example, preferably about 9.5, on the Moh's scale. The hard particles may be controlled at a size such that light may be transmitted through the sheet with little or no apparent light scatter. Where transparency is not a criterion, the average particle size may range broadly over the range of about 0.001 to 10 microns. However the particle size may not exceed 0.1 micron where transparency is desired. The average center to center distance between particles is such that the ratio of the distance to the average particle size is greater than 1 but less than 20.

---

This application is a division of copending application Ser. No. 672,903, filed Oct. 4, 1967, now abandoned.

This invention relates to a method for producing a sheet-like composite plastic material or coating characterized by improved hardness and resistance to abrasion and, in particular, to a hardened transparent plastic sheet-like material having flexible characteristics and capable of being formed and cut.

Generally speaking, plastics hardened by known methods tend to be brittle and to exhibit low resistance to shock. It would be desirable to provide a plastic composition having improved hardness and resistance to abrasion, while retaining, as much as possible, the original properties of the plastic with respect to formability, workability, resistance to impact and general utility which is characteristic of plastic materials.

It is thus the object of this invention to provide a method for producing sheet-like composite material characterized by improved hardness and resistance to abrasion.

Another object of this invention is to provide a substantially transparent composite sheet of plastic material containing a uniform dispersion of finely divided inert hard particles while exhibiting suitable light transmitting properties.

A further object of this invention is to provide a substantially transparent hardened composite plastic material in the form of a coating on a substrate.

A still further object of this invention is to provide a hardened plastic sheet-like material capable of being formed and worked while providing the necessary strength for use as a material of construction, similar to safety glass and the like.

An additional object is to provide a flowable composite plastic composition for use in coating large area surfaces in the form of a hard transparent thin adherent film having suitable light transmitting properties.

These and other objects will more clearly appear when considered in the light of the accompanying drawing and the following disclosure and the appended claims, wherein:

FIG. 4 is a hardness curve similar to FIG. 2;

FIG. 5 shows, in enlarged cross section, a substrate of plastic or glass coated with the hard plastic coating of the invention;

FIG. 6 is similar to FIG. 3, except that the spaced particles are rod-like in shape;

Figure 1:
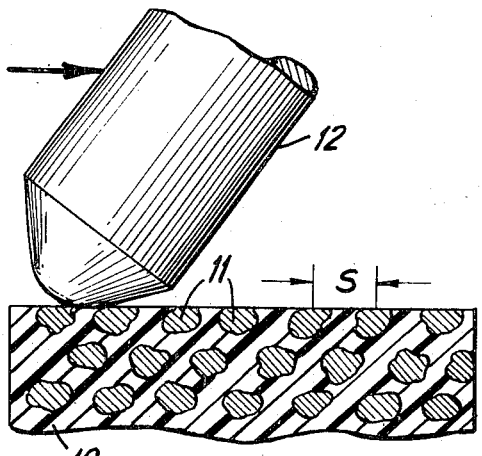
FIG. 1 is an enlarged cross section of a plastic shape showing a dispersion of hard substantially regular shaped particles near the surface thereof.

Stating it broadly, the invention provides a hard composite plastic composition wherein inert hard particles are employed over controlled size ranges to enhance the hardness of the plastic while retaining to some degree the inherent properties of the plastic, such as flexibility, formability, resistance to shock (impact), and the like. The hard particles are dispersed uniformly through the plastic matrix and are controlled over a size range to impart improved physical properties to the plastic.

The term "hardness" employed herein is the hardness defined by the Moh's scale. This hardness is generally referred to as the scratch hardness and is defined as the ability of a material of one hardness level to scratch a material of a lower hardness level, as opposed to penetration hardness of the Brinell and Rockwell types. In the Moh's hardness scale, diamond is deemed the hardest at 10 and talc the softest at the value of 1. The Moh's hardness scale is preferred in that it provides a hardness designation which is meaningful with respect to wear and abrasion resistance. It is within the frame of the reference that the Moh's hardness is employed in defining the materials produced in accordance with the invention.

In its broad aspects, the average size of the disperse particles may range from about 0.001 to 10 microns. Where optimum properties are desired, I find working over the range of up to 4 microns and, more advantageously, from about 0.001 to 2 microns to be particularly desirable. Where it is desired to maintain transparency of a plastic sheet while at the same time increase its hardness, the average particle size is controlled over the range of about 0.001 to 0.2 micron and more advantageously from about 0.001 to 0.1. When the particle size ranges from about 0.4 to 2 microns, the appearance of the plastic coating or sheet under transmitted light tends to be milky. At particle sizes from about 2 to 10 microns, a normally transparent sheet shows some apparent light scattering which, however, may not detract from its utility for certain applications.

An important criterion in achieving the desired hardness is the volume loading of the hard phase or particle in the plastic and the particle spacing as measured from center-to-center of adjacent particles. As will be evident, the smaller the particle size for a given volume loading, the smaller will be the particle spacing. For my purposes, I have found that the particle spacing should not exceed about twenty times the average diameter of the particle. Where the particle is rod-like or cylindrical in shape, the spacing is preferably between the particles oriented in the same direction. Assuming, however, the particle to be spherical and of a diameter of about 0.2 micron, the center-to-center particle spacing should not exceed about 4 microns. Generally speaking, I find it advantageous to maintain the center-to-center particle spacing to below ten times the average diameter of the particles, and more advantageously, to below about five times the size where the particle has a regular shape, such as a sphere or a cube, particularly over the particle size range of 0.001 to 0.2 micron, so long as the ratio of the spacing to the average diameter is over 1.

If the particles are too far apart, the hardness increase may not be sufficient for the purposes intended. In addition, if the center-to-center particle spacing is above the desired maximum, scratches may develop in the surface of the plastic, since the particle density at the surface will not be sufficient to intercept or prevent the scratches from forming in an abrasive environment, as might occur when a surface is subjected to scuffing. Moreover, if the particles are too large and are dislodged during use of the material as a coating, such particles may tend to cause scratches in the surface of the coating. When the particles are sufficiently small they generally do not form visible scratches even if dislodged, but instead have the effect of a fine polishing compound.

Referring to FIG. 1, a representation of a metallographic cross section of a plastic surface 10 is depicted showing a dispersion of finely divided particles 11 therethrough spaced at an average center-to-center distance "S." A stylus 12 which, of course, is much larger than the particles, is shown being moved in the direction of the arrow, the end of the stylus being maintained in contact with the surface. As the stylus traverses the surface, its contacting end intercepts a plurality of hard particles and reacts as if the plastic surface has been increased in hardness. As will be appreciated, as the particles are subdivided and brought closer together, the hardness as measured on the Moh's scale will tend to increase, the limiting or maximum hardness possible being that of the hard particle itself. Since the distance between the particles is important in achieving the results of the invention, this can be determined by a formula which relates center-to-center particle distance to the average particle diameter or size and the volume fraction of the particles in the plastic, assuming the particles to be substantially spherical in shape and each located in a unit cube of the plastic matrix corresponding to the volume fraction. In the formula, the distance "S" is measured from the center of one particle to the other of average diameter "D" and volume fraction "$f$" (note FIG. 8):

$$S = D(\pi/6f)^{1/3} \quad (1)$$

Examples of particle spacings correlated to particle diameter and volume loading is given in the table below by way of example for particles ranging in size from about 0.001 to 10 microns.

TABLE I

| Particle size, microns | Center-to-center particle spacing "S" in microns for various particle sizes for given volume fraction "$f$" | | | | | |
| --- | --- | --- | --- | --- | --- | --- |
| | $f=0.02$ S | $f=0.04$ S | $f=0.08$ S | $f=0.15$ S | $f=0.25$ S | $f=0.50$ S |
| 10 | 29.7 | 23.6 | 18.8 | 15.2 | 12.8 | 10.2 |
| 3 | 8.91 | 7.08 | 5.64 | 4.56 | 3.84 | 3.06 |
| 2 | 5.94 | 4.76 | 3.76 | 3.04 | 2.56 | 2.04 |
| 1 | 2.97 | 2.36 | 1.88 | 1.52 | 1.28 | 1.02 |
| 0.5 | 1.48 | 1.08 | 0.94 | 0.76 | 0.54 | 0.51 |
| 0.2 | 0.59 | 0.48 | 0.38 | 0.3 | 0.256 | 0.204 |
| 0.1 | 0.3 | 0.24 | 0.19 | 0.15 | 0.13 | 0.102 |
| 0.05 | 0.15 | 0.12 | 0.09 | 0.08 | 0.064 | 0.051 |
| 0.02 | 0.06 | 0.05 | 0.04 | 0.03 | 0.026 | 0.0204 |
| 0.01 | 0.03 | 0.024 | 0.019 | 0.015 | 0.013 | 0.0102 |
| 0.001 | 0.003 | 0.0024 | 0.0019 | 0.0015 | 0.0013 | 0.00102 |

To assure the desired hardness for a particular volume loading, it is advantageous that the particle spacing not exceed about 20 and, more advantageously, 10 times the average particle size or diameter of the hard phase. Assuming an average particle size of "D" micron for a spherical particle, the ratio of particle spacing "S" to the average diameter "D" (S/D) is given by way of example for various volume fractions in the following table:

TABLE II

Ratio of center-to-center spacing to particle diameter]

| Volume fraction | 0.01 | 0.02 | 0.04 | 0.08 | 0.15 | 0.25 | 0.50 |
| --- | --- | --- | --- | --- | --- | --- | --- |
| Ratio S/D | 3.75 | 2.97 | 2.36 | 1.88 | 1.52 | 1.28 | 1.02 |

For spherical particles, the ratio is generally kept below about 5.

As the center-to-center distance between particles decreases with increasing volume fraction, the effect is to increase the Moh's hardness at the surface of the plastic. This effect will be understood by referring to FIG. 3 which is a plot of Table II showing the correlation between the center-to-center particle spacing to particle diameter ratio (the ordinate) and the volume fraction (the abscissa). Since the Moh's hardness of the composition will decrease with increase in particle spacing, by maintaining the center-to-center particle spacing less than five times the diameter of, for example, a spherical particle (note the dotted line in FIG. 3), improved hardness is obtained. As will be noted, curve B appears to approach an asymptotic limit with increasing volume fraction of hard particle as will the Moh's hardness. With curve B, the spacing limit is reached for spherical particles at $f = \pi/6$ or 0.524, where the particles touch each other, that is where S/D equals 1. It will be noted that the shape of curve B is similar to the empirical hardness curve of FIG. 2 to be discussed later.

It is desirable that the hard particles employed in the composition have a hardness of at least about 5 on the Moh's scale and, more advantageously, at least about 7. In many applications, particularly where optical image transmission is required, it is preferred that the particles be transparent, although that is not essential where only improved wear resistance is the criterion and transparency is not essential. Examples of hard particles which may be employed are quartz which has a hardness of 7, topaz which has a hardness of 8, aluminum oxide (sapphire) which has a hardness of 9, silicon carbide which has a hardness of 9.5, and diamond which has the greatest hardness of 10. Silicon carbide has been found particularly advantageous in formulating the composition of the invention. Other carbides may be employed such as WC, MoC, TiC, ZrC, VC, CbC, TaC. Submicron particles that are opaque or strongly colored are useful as pigments as well as for hardness. Coatings may be made from these materials which are colored, transparent and hard. These pigments are highly absorbing or reflecting and need only be used in these coatings. For thicker sheets, a predominance of transparent particles are required to provide good transparency. Each of the refractory carbides listed above has an intrinsic hardness of substantially over 7 on the Moh's scale. Most of the conventional transparent plastics may be dispersion hardened in accordance with the invention by incorporating finely divided hard particles therein, particularly submicron particles.

It may be advantageous to employ particles having a rod-like or cylindrical shape whose length is equal to or is greater than its average diameter. An advantage of such particle shape is that with its length equal to the diameter of a spherically shaped particle, less material is required to obtain the same center-to-center spacing between rod-like particles as compared to spherical particles. This will be apparent by referring to FIG. 8 which shows two adjacent unit cubes X and Y of equal size having two spheres 13 and 14 of diameter "D" located in the center of a cube at a center-to-center distance "S." As is clearly evident, the center-to-center particle distance "S" is equal to the length of each side of the cube. For comparison, each sphere has located in it a cylindrical particle 15 and 16, respectively, of diameter "$d$" and length "D" equal to the sphere diameter, the center-to-center distance between the cylindrical particle being the same as that for the spheres, the volume fraction of the cylindrical particle illustrated being obviously less than that of the sphere. The two can be compared mathematically as follows:

For spherical particles of diameter D, let N be the number of particles per unit volume.

Volume of a unit cube per particle $= 1/N$ (2)

$$S = (1/N)^{1/3} \qquad (3)$$

The volume fraction of spherical particles $= f_0$
Then $f_0 = (\pi D^3/6)/(1/N)$ (4)
Solving equation (4) for N:

$$N = 6f_0/\pi D^3 \qquad (5)$$

Substituting N in equation (3):

$$S = (\pi D^3/6f_0)^{1/3} \qquad (6)$$

Figure 8:
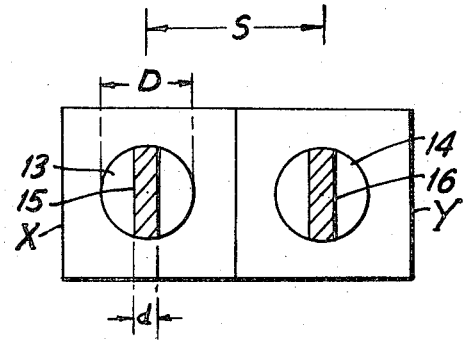
FIG. 8 depicts a unit cube showing the relationship between a rod-like particle and a spherical particle.

Assuming now a cylindrical particle of diameter $d$ and length equal to the diameter D of a sphere as shown in FIG. 8:

Volume of the particle $= \pi d^2 D/4$ (7)
Setting the volume fraction of the cylindrical particles to be $f_c$:

Then $f_0 = (\pi d^2 D/4)/(1/N)$ (8)
Solving equation (8) for N:

$$N = 4f_c/\pi d^2 D \qquad (9)$$

The ratio of the sphere diameter D to cylindrical diameter $d = L$;

$$\text{or } L = \frac{D}{d} = R$$

$$D = dR \qquad (10)$$

Substituting (10) in equation (9):

$$N = 4f_c/\pi d^3 R \qquad (11)$$

Substituting N in equation (3):

$$S = (\pi d^3 R/4f_c)^{1/3} \qquad (12)$$

Assuming the same number of particles N per unit volume, equation (5) is then equal to equation (11):

$$6f_0/\pi D^3 = 4f_c/\pi d^3 R$$

Solving for $f_c$:

$$f_c = 3f_0/2R^2$$

$$f_c = 1.5f_0/R^2 \qquad (13)$$

Assuming $f_0 = 0.2$ and $R = 1$:
Then $f_c = 0.075$

Thus, a lower volume fraction of rod-like particles is required to achieve the same center-to-center spacing achieved with spheres of higher volume fraction. As R exceeds 1, the volume fraction of the rod-like particles decreases to even lower values. The volume fraction should be at least 0.01.

Using equation (12), the center-to-center spacing S for a rod-like particle of length R equal to 10 and average diameter $d$ equal to 0.1 micron can be determined in microns from which $S/d$ is obtained as noted in the table below for volume fractions $f_c$ ranging from 0.01 to 0.3.

TABLE III

| $f_c$ | 0.01 | 0.05 | 0.1 | 0.2 | 0.3 |
|---|---|---|---|---|---|
| S | 1.98 | 1.16 | 0.92 | 0.71 | 0.64 |
| S/d | 19.8 | 11.6 | 9.2 | 7.1 | 6.4 |

The distance S is determined for rod-like particles oriented substantially normal to the surface of a substrate. The foregoing is illustrated by curve C in FIG. 6. The distance ratio there shown should not exceed 20 (note dotted line E).

Stating it broadly, the center-to-center spacing for particles, be they spherical, cylindrical or prismatic in shape may range in microns as follows:

$$40 > S > 0.05 \qquad (14)$$

or more advantageously, $$20 > S > 0.1 \qquad (15)$$

The ratio of center-to-center spacing to average particle diameter D', where D' is the diameter of a sphere, or the average diameter of a regular shaped particle or the average diameter of a cylinder or the average cross-sectional diameter of a prism is given as follows:

$$20 > S/D' > 1 \qquad (16)$$

or more advantageously, $$10 > S/D' > 1 \qquad (17)$$

Where the particles are usually spherical in shape, the following range is particularly advantageous:

$$5 > S/D' > 1 \qquad (18)$$

The ratio will always exceed 1 since at a ratio of 1 the particles would touch each other.

Examples of plastics which may be dispersion hardened to produce hardened compositions in accordance with the invention are: polyvinyl chloride, cellulose acetate, cellulose acetate butyrate, cellulose nitrate, polyvinyl formal, polyvinyl butyral, polyvinyl acetal, epoxy polymers, polyacrylic polymers such as polymethacrylate, polyallyl dyglycol carbonate, copolymers of polysilicic acid, and polyvinyl alcohol, polyvinyl alcohol acetate, among others.

In producing the composite material of the invention, the hard finely divided particle, e.g. silicon carbide, is utilized in amounts ranging from about 1 vol. percent to about 50 vol. percent or from about 1 vol. percent to 40 percent, at particle sizes ranging as stated hereinabove, such as from about 0.01 to 0.06 micron, the particles being dispersed within a monomer. Volume loadings found useful are those falling within the range of about 1 to 25 vol. percent. The monomer, e.g. acrylic monomer, may be initially partially polymerized to a suitable viscosity. The mixture may then be further polymerized by heat between polished plates to form sheets which may be flat or curved. Sheets of the composition may be stretched axially or biaxially to increase the mechanical strength thereof.

As one embodiment, the mixture may be produced as a flowable coating for application to windows where a transparent but hard wear and scuff resistant coating is desired. A technique for producing and applying flow coats is disclosed in U.S. Pat. No. 2,721,809, granted on Oct. 25, 1955. In this technique of applying a smooth coating to a window, a temporary trough is attached to the bottom of a vertically disposed window. The flow coat mixture is drawn from a tank under pressure and is applied via a nozzle or applicator to the window. First, a vertical side edge of the window is wetted from top to bottom and then the applicator is moved across the window at the top from left to right at a controlled speed to permit the liquid composition to flow uniformly down the window into the trough. Excess liquid in the trough is recycled to the storage tank while the coating drains uniformly to a thin film and then dries to form a hard, transparent coating.

One of the advantages of the present invention is that it can be used in combination with ultraviolet, visible and infrared light-absorbing compositions disclosed in U.S. Pat. No. 3,298,959, granted Jan. 17, 1967. In that patent, film-forming compositions are disclosed having selective light-absorbing characteristics for coating large area surfaces, particularly materials having the property of absorbing ultraviolet light almost completely, and modifying visible and infrared light. The present invention is advantageous in upgrading the hardness and the resistance to abrasion of such film-forming compositions. The ultraviolet light-absorbing composition may comprise a clear transparent plastic film-forming solution having suspended therein by weight of said solution of about 0.01% to 2% light-absorbing particles, such as carbon black or iron blue (Prussian blue), the solution comprising a solvent portion and a solute portion. The light-absorbing particles have a size not exceeding 0.05 micron and preferably an average size not exceeding 0.01 micron. The solvent portion is preferably composed of 5% to 25% by weight of slow evaporation rate solvents and the balance intermediate evaporation rate solvents, with the solute portion comprising a transparent film-forming plastic material in an amount not exceeding its solubility in the solvent portion. The amount of hard particles added, e.g. silicon carbide, will depend on the amount of plastic material present in the solution. The solution is cast upon a substrate, such as a glass window, using the flow coat method, whereby to form a hard film upon drying characterized by having selective light-absorbing properties as well as provide for the unscattered transmission of ordinary light.

The foregoing technique for hardening transparent plastic films or sheets while retaining certain optical properties is also applicable to the production of plastic films which exhibit substantial reflectivity and partial transparency. For example, plastic films may contain a uniform dispersion of reflective metal particles in the form of thin platelets of irregular shape. These platelets may have a long dimension ranging from about 0.3 to 10 microns, with thicknesses in the order of about 10 to 100 angstroms. In most cases, the foregoing range of thicknesses will provide some degree of transparency ranging from about 5 to 80%, while at the same time provide some reflection of incident light. Thus, the invention may be employed to produce a hardened, wear resistant film exhibiting partial transparency and partial reflectivity.

The film provided by the invention may also be used as a hard and wear-resistant coating on plastics which are readily more or less subject to scratching, whereby the underlying plastic is upgraded by the hard surface coating so as to greatly improve its wear resistance and render it more difficult to scratch. In addition, the hard film finds utility in the protection of transparent surfaces, such as optical elements, from weathering or abrasion.

Empirical tests with a silicon carbide-plastic composition have shown that small amounts of silicon carbide such as 8% by weight (about 3% by volume) of particle size of about 0.5 micron can upgrade a plastic having a Moh's hardness of from 3 to 4 to a hardness equal to that of glass, for example to 6.5. A method which is employed for determining scratch hardness of a surface is to place a given amount of powder of a standard reference material, such as water-dispersed pumice which has a scratch hardness of about 6, upon the surface to be tested and place over it a rubber pad against which a constant force of about 15 lbs./in.$^2$ is applied. The water dispersed pumice is generally a 50-50 mixture. The rubber pad is dragged over the surface 10 times while the load is applied and the surface under test then washed and rinsed with clear water. The test conducted on the foregoing composition produced substantially no scratches when the surface was examined under ambient light, thus indicating that the Moh's hardness was above about 6 and close to that for glass. This is exceptional considering that only about 3 volume percent of silicon carbide is present. This is understandable by referring to FIG. 3 which shows that the ratio of center-to-center particle spacing to average particle diameter decreases somewhat rapidly up to about 5 volume percent (0.05 volume fraction) and levels off somewhat at over 8 to 10 volume percent, particularly above 10 volume percent.

An empirically derived formula relating Moh's hardness to volume percent (volume fraction) of the hard phase results in a curve of shape similar to that shown in FIG. 2, the formula being given as follows:

$$H = H_0 + (H_{max} - H_0) \cdot (1 - e^{-kf}) \quad (19)$$

in which, for spherical particles, $f$ is less than or approximately equal to $\pi/6$, and H is less than or approximately equal to $H_{max}$.

H—is the resulting hardness of the composition.
$H_0$—is the intrinsic hardness of the plastic before hardening.
$H_{max}$—is the intrinsic hardness of the hard particle.
$f$—is the volume fraction of the hard particle.
$k$—is a constant depending on the hard material and the particular plastic matrix used.

Figure 2:
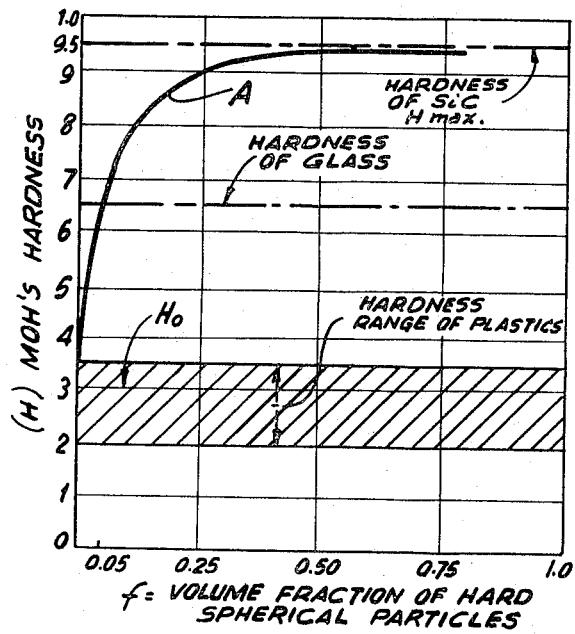
FIG. 2 is a hardness curve showing variation of Moh's hardness with volume fraction of hard particles dispersed in a plastic.
Figure 3:
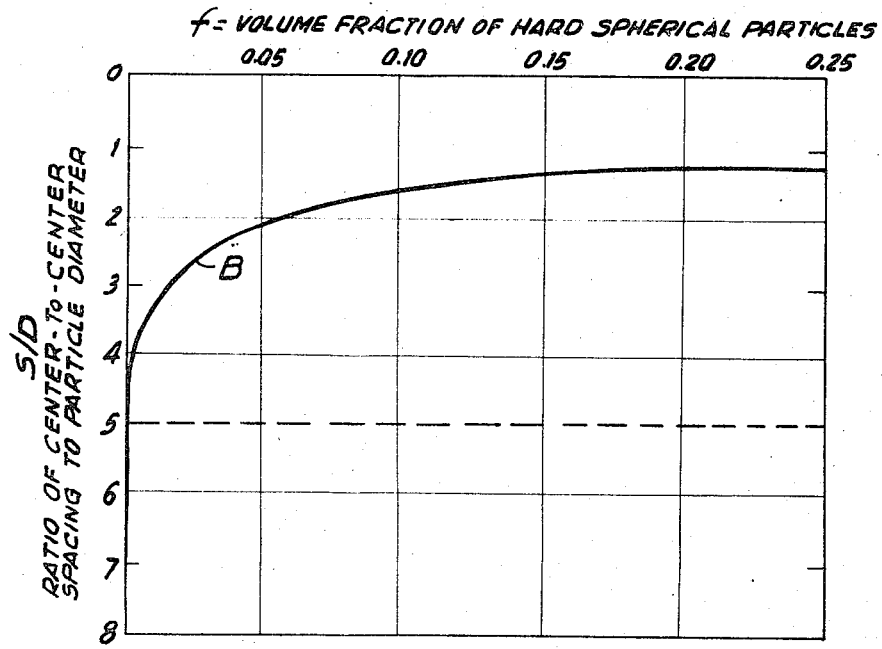
FIG. 3 is a curve relating center-to-center particle spacing to average particle diameter ratio with volume fraction of the particles.

Referring to FIG. 2, the curve A corresponds generally in shape to curve B of FIG. 3 and curve C of FIG. 6. The cross hatched area shown represents the general hardness range of most plastics. By starting with a plastic of hardness of about 3 ($H_0$) and adding to it about 3 volume percent of SiC ($H_{max}=9.5$) of particle size as stated in the empirical test described hereinbefore to produce a hardness in the product of approximately that of glass of about 6.5 (H), it is possible to determine the constant "$k$" by a log-linear plot of two points, to wit, the hardness of the plastic with zero SiC and the resulting hardness of the composition with about 3 volume percent SiC. Using the aforesaid test data, an empirical value of 24 is obtained for "k." Substituting this value value of 24 is obtained for "$k$." Substituting this value in the equation, the following is obtained:

$H = H_0 + (H_{max} - H_0)(1 - e^{-kf})$
$H = 3 + (9.5-3)(1 - e^{-24 \times .03})$
$H = 3 + 6.5 - 6.5/e^{0.72}$
$H = 9.5 - 3.16 = 6.34$ Thus, the hardness of the surface is close to that for glass as the test indicated. Using the formula with the derived constant for SiC, a curve over the lower range is shown in FIG. 4 covering compositions with 0.01 to 0.10 volume fraction of SiC (1 to 10 volume percent) as noted in the following table:

TABLE IV

| f | H |
|---|---|
| 0.01 | 4.5 |
| 0.02 | 5.4 |
| 0.03 | 6.3 |
| 0.04 | 7.0 |
| 0.05 | 7.5 |
| 0.1 | 8.9 |

As will be appreciated, the foregoing is empirical and variations are to be expected. However, generally speaking, the hardness curves will have the general shape shown in FIGS. 2 to 4 and 6. The tests confirm that small amounts of the hard particles have a remarkable effect on upgrading the hardness of the plastic.

In particular, the Moh's hardness of transparent plastic sheet or coating can be markedly upgraded without substantially adversely affecting the transparency characteristics thereof, provided care is taken in working over a controlled particle size range or ranges, otherwise light incident to the plastic surface will tend to scatter. By scatter or scattering, is meant that which occurs when light energy is deviated from its original angle of incidence to the surface of a transparent medium as it passes through the transparent medium, whereby the light intensity is reduced in the direction of propagation. The scattering effect, or extinction as it is also called is expressed by the term Q, assuming the disperse particles to be nonabsorbing spheres, the term being defined as follows:

$$Q \alpha F(m, x) \quad (20)$$

where $m$—is the relative index of refraction between the particle and the transparent medium obtained by dividing the index for the particle by the index for the medium, and $x$—is the function of the particle radius and the average wavelength of light as expressed by the following equation:

$$x = 2\pi a/\lambda \qquad (21)$$

"$a$" being the particle radius and "$\lambda$" being the average wavelength of light.

Figure 7:
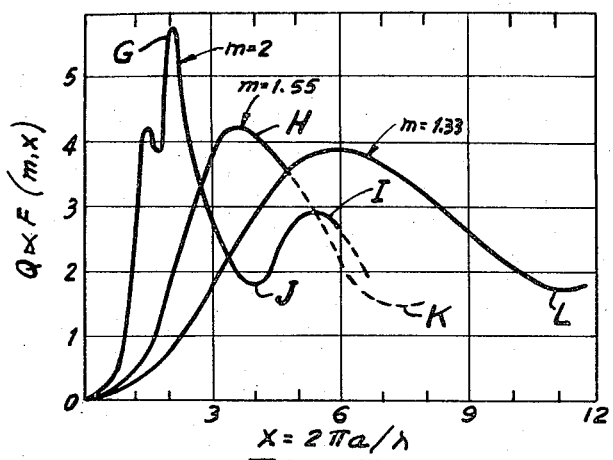
FIG. 7 depicts a set of curves depicting the transparency characteristics of a transparent medium having dispersed particles therein of different indices of refraction.

The relationship between the scattering efficiency Q and the variables $m$ and $x$ is shown in FIG. 7 which is taken from page 151 of the book entitled, "Light Scattering by Small Particles," by Van de Hulst (published by John Wiley, 1957 ed.). Referring to FIG. 7, Q and $x$ values are given for $m=2$, $m=1.55$ and $m=1.33$. Assuming the average wavelength of light to be about 5500 angstroms or 0.55 micron, the following values for particle radius and diameter are obtained:

TABLE V

| $x$ | Particle size, microns | | $Q=F(m, x)$ | | |
|---|---|---|---|---|---|
| | Radius, $a$ | Diam., $d$ | $m=2$ | $m=1.55$ | $m=1.33$ |
| 0.1 | 0.009 | 0.018 | <0.1 | <0.1 | <0.1 |
| 0.2 | 0.018 | 0.036 | <0.1 | <0.1 | <0.1 |
| 0.3 | 0.027 | 0.054 | <0.1 | <0.1 | <0.1 |
| 0.4 | 0.036 | 0.072 | <0.2 | <0.2 | <0.1 |
| 0.5 | 0.045 | 0.090 | <0.2 | <0.2 | <0.1 |
| 0.8 | 0.072 | 0.144 | 0.4 | 0.2 | 0.1 |
| 1.0 | 0.088 | 0.176 | 1.5 | 0.2 | 0.2 |
| 1.2 | 0.106 | 0.212 | 2.0 | 0.4 | 0.2 |
| 2.0 | 0.176 | 0.352 | 5.8 | 2.0 | 0.8 |
| 3.0 | 0.264 | 0.528 | 3.0 | 3.8 | 1.78 |
| 4.0 | 0.352 | 0.704 | 1.8 | 4.22 | 2.6 |
| 7.0 | 0.616 | 1.232 | 3.0 | 1.6 | 3.5 |

As will be noted, each of the curves in FIG. 7 has a first maximum or peak G, H and I, respectively, each of the curves also having a first minimum J, K and L. The parameters divide the useful particles into a lower range with Q less than 2; that is to say, in order to insure little or substantially no scattering, the average particle diameter should not exceed about 0.2 micron in size (note Table V). Thus, with $x$ equal to about 1.2, the maximum particle size where Q does not exceed 2 (for $m=2$) is 0.2 micron. For very small values of $x$ of less than 1 (particle sizes less than 0.176 micron), the scattering is negligible and the medium is substantially transparent. By working at or below the first minimum J of each of the curves, optimum Q values (i.e. optimum values below 2) are assured. Thus, for the curve $m=2$, the first minimum K (i.e. Q=1.8) is at $x=4\pm0.5$; for the curve $m=1.55$, the first Q minimum of 1.5 is at $x=7.5\pm0.5$; for the curve $m=1.33$, the first Q minimum L (Q=1.8) is at $x=11\pm0.5$.

Figure 9:
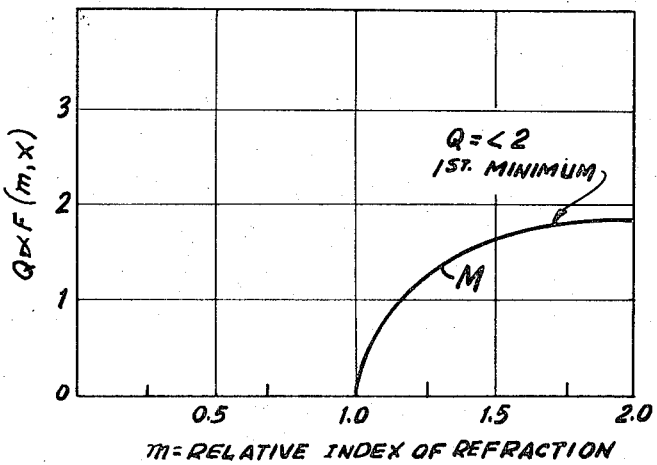
FIGS. 9 and 10 are curves derived from the data of FIG. 7.
Figure 10:
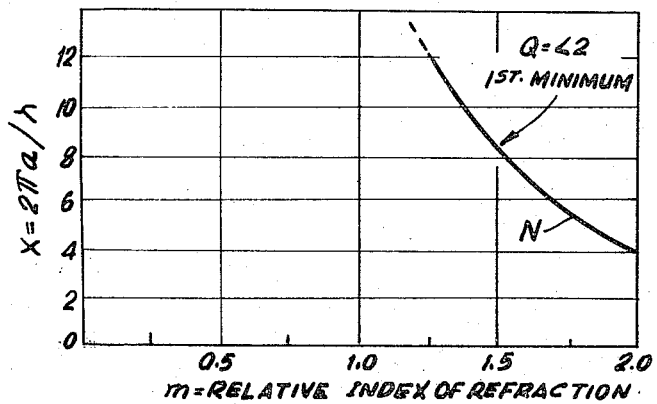

A curve M showing Q first minimum below 2 as a function of $m$ is depicted in FIG. 9. The Q value for $m=1$ would be substantially zero (neglecting slight losses due to reflection), since both the particle and the medium have the same index of refraction. The Q minimum reaches a maximum below Q=2 at about $m=2$. FIG. 10 is another way of illustrating the relationship by plotting $x$ as a function of $m$. As will be apparent, curve N rises rapidly to a high $x$ value as it approaches $m=1$, since where the index of refraction of the particle is the same as that of the transparent medium, particle size should have little effect on the Q value.

In order to insure transparency characterized by a high degree of clarity, I find it advantageous to control the size of the hard particle over the range of about 0.001 to 0.2 micron, and, more advantageously, from about 0.001 to 0.1 micron. However, a desired amount of transparency can be achieved at larger particle sizes of about 1.5 to 2 microns by staying at or near the first minimum of curves shown in FIG. 7 and restated another way in FIGS. 9 and 10 over a relative index of refraction range of from $m=1.2$ to $m=2$. A suspension of silicon carbide of index of refraction of 2.654 in a plastic film of index of refraction of 1.5 provides a relative index of 1.64.

While most finely divided materials may generally have a particle size distribution containing a coarse fraction, I find I can use such materials provided the coarse particles are centrifuged out. For example, in employing silicon carbide powder having a maximum of 10 micron dimension, 50 grams of the powder may be suspended in 150 grams of fluid comprising 25% polymer (solids content). The coarser or heavier particles are centrifuged out, with the smaller particles retained in the supernatant liquid. The amount of silicon carbide in suspension can be determined by measuring the density of the fluid suspension. The average particle size of the material retained can be determined by methods well known in the art.

As illustrative of the various embodiments provided by the invention, the following examples are given.

EXAMPLE 1

In the production of a hardened methyl methacrylate sheet, methyl methacrylate monomer is provided to which is added a polymerizing agent, e.g. 1% by weight of benzoyl peroxide, and the monomer allowed to partially polymerize until it becomes syrupy. While in the syrupy state, 8 volume percent of silicon carbide is added having an average particle diameter of about 0.1 micron and the mixture stirred to insure a uniform dispersion. On the basis of the volume loading and particle size and a substantially uniform dispersion of the particle through the plastic, the center-to-center particle spacing may range from about 0.15 to 0.25 micron, whereby to upgrade substantially the hardness of the plastic. Smaller particle dimensions will give greater clarity.

The thick mixture is then placed between two sheets of glass and heated to 120° C. to form a stiff sheet. If it is desired, the sheet may be stretched oriented to increase its strength. An advantage of the hardened sheet is that it can be formed or otherwise treated like an unhardened sheet. Such hardened material may be used in the making of bubble canopies for aircraft, where improved resistance to abrasion is an important requirement. The composition may have included in it light-absorbing material, such as an ultraviolet light absorber disclosed in U.S. Pat. No. 3,298,959.

EXAMPLE 2

As plastics are more and more being used for eye glass lenses, it would be desirable to provide a hardened composition capable of withstanding abrasion during use. An example of one plastic capable of being further hardened for use as an eye glass lens is polyallyl diglycol carbonate. The plastic which is available as a while fluid monomer is treated with a polymerizing agent or accelerator, such as benzoyl peroxide, and a hard phase, e.g. zircon powder, then added to it while the monomer is syrupy. The zircon powder has an average particle size of about 100 angstroms (0.01 micron) and is added in amounts corresponding to a volume loading of 15%. The mixture is cast into a lens mold and allowed to polymerize at 100° C. After the material has hardened, it is removed from the mold.

EXAMPLE 3

The composition of the invention is particularly applicable in the production of articles, such as telephone headsets, from thermoplastics. Examples of thermoplastics used in the production of housings for appliances and the like are cellulose acetate, cellulose acetate butyrate, cellulose propionate, ethyl cellulose and other common plastic molding compositions. An example of a thermosetting plastic is phenol formaldehyde. These plastics have in common toughness, colorability and ease of fabrication. They are available in grades ranging from soft to hard, from tough resilience to high rigidity and can be crystal clear or colored to any degree.

In upgrading the scratch hardness of cellulose acetate for use in producing a telephone headset, molding pellets of any common plastic molding compound, such as cellulose acetate, are produced containing about 25% by volume of corundum ($Al_2O_3$) of average particle size of about 0.2 micron. This amount of the hard material and size will markedly upgrade the scratch hardness of the cellulose acetate with the center-to-center particle spacing ranging from about 0.2 to 0.3 micron. The corundum, which has a Moh's hardness of about 9, is uniformly dispersed through fluid cellulose acetate which is then pelletized to provide on cooling spherical pellets for hot molding purposes. In producing a telephone headset, a given weight of the pellets with the dispersed hard material is pressure fed while hot into a headset mold at a temperature of about 250° C. The mold with the plastic is allowed to cool to harden the molded article and the molded article removed therefrom.

EXAMPLE 4

Optical lenses made of plastics are generally subject to weathering and abrasion during use. In order to protect the lens, it is not uncommon to provide a hard protective coating upon the lens surface. In U.S. Pat. No. 3,324,055, which issued on June 6, 1967, coatings of improved hardness are provided which are thin, uniform and substantially free from light scatter having a scratch hardness in the neighborhood of about 4 on the Moh's scale. I find that such coatings can be even further enhanced, particularly for use as protective coatings for such soft plastics as cellulose acetate. An example of such a coating is one containing polyvinyl silicate.

In producing the coating material, the following ingredients are used:

Solution A

| | Parts by weight of solution |
|---|---|
| Polyvinyl acetal | 6 |
| Polyvinyl formal | 4 |
| Acetic acid | 90 |
| Total | 100 |

Solution B

Hydrolyzed tetraethyl orthosilicate (25% $SiO_2$).

Solution C

30% methyl methacrylate monomer in n-butanol.

The foregoing solutions are mixed together in the following proportions to provide 100 parts by weight of solution having a total solids content of 15.75 parts by weight:

TABLE VI

| Materials | | Solution | Solids | Percent solids |
|---|---|---|---|---|
| Initial | Final | | | |
| A | {Polyvinyl acetal / Polyvinyl formal} | 65 {3.9 / 2.6} | 6.5 | 41 |
| B | Silica | 25 | 6.25 | 40 |
| C | Methyl methacrylate | 10 | 3.00 | 19 |
| Total | | 100 | 15.75 | 100 |

Silicon carbide of average particle size of about 0.01 micron (100 angstroms) is added to the foregoing mixture in an amount of about 2.25 parts by weight, whereby to provide a total solids content in the solution of about 18 parts by weight (15.75+2.25). This amount of silicon carbide on the volume basis in the dried film is about 5 volume percent. After the hard material is added to the solution, it is uniformly dispersed therein by mixing and the solution then applied as a coating to a lens made of cellulose acetate and allowed to dry. The dispersion will have a center-to-center particle spacing ranging from about 0.02 to 0.04 micron or 200 to 400 angstroms and provide improved wear resistance.

EXAMPLE V

In producing billfolds made from cellulose acetate, polyvinyl chloride, or the like, it would be desirable that the surface of the plastic material have good wear resistance. Where the material is a cellulose acetate sheet of about 0.01 to 0.02 inch thick, its surface property can be further enhanced by applying a hard coating comprising about 10 parts by weight of polyvinyl acetal dissolved in a solvent of toluol and butyl acetate. To the dissolved plastic is added 1.3 parts by weight of silicon carbide of average particle size of about 2 microns in order to provide a dispersion of about 5 volume percent of silicon carbide in the plastic remaining after evaporation of the solvent. The sheet of cellulose acetate is then coated with the coating solution which is allowed to dry to form a hard, scuff-resistant coating as a protective layer over the acetate sheet. The dispersion will have a center-to-center particle spacing of about 4 to 5 microns.

It is herein to be noted that as used in the present application, the term polymerizing agent is intended to include not only polymerizing agents, initiators, and activators, but also cross-linking agents such as hydrolyzed tetraethyl orthosilicate.

It is apparent from the foregoing that the composition of the invention can be used in various ways. When used as a coating, generally the coating solution will contain up to about 40 parts or 10 to 30 parts by weight of the plastic and the balance a solvent. The hard particles would then be added to the solution in amounts calculated to provide in the plastic a dispersion ranging in volume loading from about 1% to 40% taken on the dry basis over a range of particle sizes stated hereinbefore.

Where a composition for casting thin films or sheets is desired, the solution may advantageously contain about 20 to 40 parts by weight of a film-forming plastic material as the solute, the balance being a solvent such as a mixture of low and high boiling material, for example as disclosed in U.S. Pat. No. 3,298,959. The finely divided hard material would be added in amounts to provide a film containing the hard material over the ranges and sizes stated hereinbefore.

In its broad aspects, the invention provides a composition of matter which in one embodiment may comprise a moldable plastic containing a fine dispersion of hard particles of hardness at least about 5 on the Moh's scale, and more advantageously a hardness of at least about 7.

In another embodiment, the composition may be in the form of a castable solution capable of forming a hardened film by solvent evaporation.

In still another embodiment, the composition may be a coating solution which leaves a hardened coating on a substrate (note FIG. 5), e.g. a window, lens, plastic, etc., upon solvent evaporation, wherein the hard particles are dispersed through the coating at controlled interparticle distances.

The invention also provides a polymerizable composition in the form of a fluid monomer to which the hard material is added, the fluid having a small amount of polymerizing agent for accelerating the polymerization after a uniform mixture has been produced.

Lastly, the invention provides as an article of manufacture a hardened plastic material, be it a film, a sheet, a molded product, such as appliance housings, billiard balls, a coated substrate, an extruded rod or tubing or any other product that can be made from the plastic composition of the invention.

The hard material may range in amount from about 1% to 50% or 1% to 40% by volume, an advantageous working range being about 1% to 25% by volume.

Figure 1A:
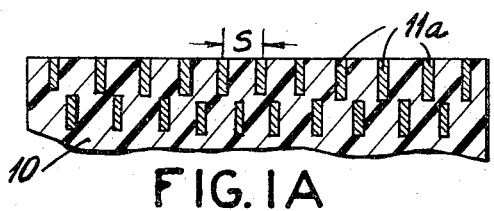
FIG. 1A is a cross section similar to FIG. 1, except the particles have a rod-like or cylindrical shape.

While, generally speaking, it is desirable that the hard material be in the form of uniformly-shaped particles, it will be appreciated that particles of various shapes can be used. For example, elongated particles, e.g. needles, may be employed having a long dimension greater than its average diameter (note FIG. 1A). Such particles when used for hardening a film or coating can be oriented by an electrical field so that the particles are substantially normal to the surface of the coating, whereby to minimize light scatter where transparency is desired. Silicon carbide may be advantageously employed in that it is available in the form of long irregular platelets or rods of α-SiC having a small percentage of cubic β-SiC. These platelets or rods can be treated as if they were cylinders and can be aligned electrically so that they will be oriented normal to the surface of the plastic.

The rod-like particles, be they SiC or other hard material, are dispersed in a plastic coating solution and the coating applied to a transparent substrate. The coating is allowed to dry until it reaches a moderate viscosity, whereupon the particles are electrically oriented normal to the coated surface and drying continued to fix the particles in their oriented position. For example, in orienting rod-like particles of α-SiC, orientation may be achieved at 60 cycle AC with an electric field intensity of 50 kv./cm. The alignment is better at higher frequencies, even with lower electric field intensities. Generally speaking, at the lower frequency range of 60 cycles to 10 kc., the field intensity may range from about 10 to 100 kv./cm.; whereas, at over 10 kc. to about 100 kc., the electric field intensity may range from 2 to 10 kv./cm.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method of producing a film, sheet or article of polymeric material having uniformly dispersed particles of hard material comprising the steps of
   providing a fluid suspension of a polymeric material and hard particles corresponding to about 1 to 50% by volume of the suspension on the dry basis,
   disposing said suspension in a predetermined configuration,
   the improvement comprising rendering said film, sheet or article transparent by the steps of selecting hard particles having a hardness of at least 6 on the Moh's scale,
   selecting said particles having a diameter ranging from 0.001 to 0.1 micron,
   hardening said fluid suspension to form said transparent film, sheet or article,
   whereby the average center to center distance between said particles is such that the ratio of the distance to the average diameter of the particles is over 1 and does not exceed 20.

2. A method of producing a transparent, film, sheet or article in accordance with claim 1, wherein said particles are elongated particles,
   including the step of physically disposing the suspension in a predetermined shape having a defined surface,
   increasing the viscosity of said fluid suspension prior to hardening,
   orienting said particles substantially normal to said defined surface by applying an electric field thereto at a frequency of from 25 cycles to 100 kc. and a field intensity from 1 to 100 kv./cm., and
   thereafter hardening said suspension to form said film, sheet or article.

3. A method of producing a transparent, film, sheet or article in accordance with claim 1, including the step of moldably hardening said suspension to form said film, sheet or article.

4. A method of producing a transparent, film, sheet or article in accordance with claim 1, wherein said fluid suspension is of the thermosetting type, and said polymeric suspension being initially heated and thereafter permitted to harden to form said solid.

5. The method in accordance with claim 2, wherein said particles employed are selected from those having a rod-like configuration.

6. The method in accordance with claim 5, wherein said particle orientation by said electrical means is performed at a frequency range from about 50 cycles to 10 kc. and at a field intensity from about 10 to 100 kv./cm.

7. The method in accordance with claim 5, wherein said particle orientation by said electrical means is performed at a frequency range from about 10 kc. to 100 kc. and at a field intensity from about 1 to 10 kv./cm.

8. The method of claim 5, wherein the amount of hard particles selected ranges from about 1 to 25% by volume of said mixture.

9. The method of claim 5, wherein said polymeric material is selected from the group consisting of polyvinyl chloride, cellulose acetate, cellulose acetate butyrate, cellulose nitrate, polyvinyl formal, polyvinyl butyral, polyvinyl acetal, epoxy polymers, polyacrylic polymers, polyallyl diglycol carbonate, copolymers of polysilicic acid, reaction products of polysilicic acid and polyvinyl alcohol, reaction products of polysilicic acid and polyvinyl alcohol acetate, cellulose propionate, ethyl cellulose and phenol-formaldehyde.

10. The method of claim 1, wherein said fluid suspension includes a fluid monomer and a polymerizing agent.

11. The method of claim 10, wherein said polymerizing agent is capable of accelerating the polymerization of the mixture subsequent to said mixture having been made uniform.

12. In a method of producing a film, sheet or article of polymeric material having substantially uniformly dispersed particles of hard material comprising the steps of providing a solution of polymeric material in a vaporizable solvent with the amount of polymeric material ranging from 1 to 40 parts by weight of the solution, mixing together with said solution an amount of said hard particles corresponding to about 1 to 50% by volume of the mixture of said solution and said hard particles determined on the dry basis, disposing said mixture in a predetermined configuration, the improvement comprising rendering said film, sheet or article transparent by the steps of selecting hard particles having a hardness of at least 6 on the Moh's scale, selecting said particles so that substantially all of said particles have a diameter ranging from 0.001 to 0.1 micron, and evaporating said solvent to castably harden said solution and enable said polymeric material to form said transparent film, sheet or article, whereby the average center to center distance between said particles is such that the ratio of the distance to the average diameter of the particles is over 1 and does not exceed 20.

13. The method of claim 12, wherein said hard particles are selected from those having a substantially spherical configuration.

14. The method of claim 12, wherein said hard particles are selected from those having a substantially elongated configuration,
   including the step of physically disposing the solution in a predetermined shape having a defined surface,
   increasing the viscosity of said solution prior to hardening,
   orienting said particles substantially normal to said defined surface by applying an electric field thereto at a frequency of from 25 cycles to 100 kc. and a field intensity from 1 to 100 kv./cm., and
   thereafter hardening said solution to form said film, sheet or article.

15. The method of claim 14, wherein said hard particles are selected from those having a substantially rod-like configuration.

16. The method of claim 12, wherein said solution includes a fluid monomer and a polymerizing agent.

17. The method of claim 16, wherein said polymerizing agent is capable of accelerating the polymerization of the mixture subsequent to said mixture having been made uniform.

18. The method of claim 14, wherein said particle orientation by said electrical means is performed at a frequency range from about 50 cycles to 10 kc. and at a field intensity from about 10 to 100 kv./cm.

19. The method of claim 14, wherein said particle orientation by said electrical means is performed at a frequency range from about 10 kc. to 100 kc. and at a field intensity from about 1 to 10 kv./cm.

20. The method of claim 12, wherein said polymeric material is selected from the group consisting of polyvinyl chloride, cellulose acetate, cellulose acetate butyrate, cellulose nitrate, polyvinyl formal, polyvinyl butyral, polyvinyl acetal, epoxy polymers, polyacrylic polymers, polyallyl diglycol carbonate, copolymers of polysilicic acid, reaction products of polysilicic acid and polyvinyl alcohol, reaction products of polysilicic acid and polyvinyl alcohol acetate, cellulose propionate, ethyl cellulose and phenol-formaldehyde.

References Cited
UNITED STATES PATENTS

| | | | |
|---|---|---|---|
| 2,376,342 | 5/1945 | Carlton | 117—17 |
| 3,117,065 | 1/1964 | Wootten | 117—93.4 R |
| 3,329,125 | 7/1967 | Grossteinbeck et al. | 117—17 |
| 3,453,127 | 7/1969 | Marotta et al. | 260—37 R |
| 3,471,439 | 10/1969 | Bixler et al. | 260—37 R |
| 3,483,068 | 12/1969 | Brill et al. | 260—37 R |

WILLIAM D. MARTIN, Primary Examiner

J. H. NEWSOME, Assistant Examiner

U.S. Cl. X.R.

117—161 UF, 161 UE, 161 ZA, 161 ZB, 161 KC, 161 L, 166; 260—38, 40 R, 41 A, 41 B; 264—22, 319